(12) United States Patent
Hatanaka et al.

(10) Patent No.: US 7,042,453 B2
(45) Date of Patent: May 9, 2006

(54) APPARATUS AND METHOD FOR PROCESSING THREE-DIMENSIONAL GRAPHIC IMAGES

(75) Inventors: Itaru Hatanaka, Inagi (JP); Aki Okushima, Kawasaki (JP); Tatsuya Kita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 135 days.

(21) Appl. No.: 09/789,962

(22) Filed: Feb. 22, 2001

(65) Prior Publication Data
US 2002/0018064 A1 Feb. 14, 2002

(30) Foreign Application Priority Data
Jul. 11, 2000 (JP) .............................. 2000-210278

(51) Int. Cl.
*G06T 15/10* (2006.01)
(52) U.S. Cl. ...................... 345/427; 345/441; 345/442; 345/443
(58) Field of Classification Search ................ 345/427, 345/419, 441, 442, 443, 440, 467, 421; 349/139
See application file for complete search history.

(56) References Cited
U.S. PATENT DOCUMENTS
4,791,581 A 12/1988 Ohba
4,885,702 A 12/1989 Ohba
4,949,286 A 8/1990 Ohba
5,434,966 A * 7/1995 Nakazawa et al. .......... 345/419
5,990,897 A * 11/1999 Hanratty ..................... 345/420
5,990,987 A * 11/1999 Tanaka ....................... 349/139
6,215,493 B1 * 4/2001 Fujita ......................... 345/418

FOREIGN PATENT DOCUMENTS
EP 0 211 345 2/1987
JP 62-26584 2/1987
JP 7-49962 2/1995
JP 7-49963 2/1995

OTHER PUBLICATIONS
Miyata ("A Method of Generating Cloud Images Using Density Contour Lines": The Transactions of the IEICE, vol. E 72, No. 6 Jun. 1989).*

* cited by examiner

*Primary Examiner*—Kimbinh T. Nguyen
(74) *Attorney, Agent, or Firm*—Staas & Halsey LLP

(57) ABSTRACT

In an apparatus for processing three-dimensional graphic images, a first input part inputs a first two-dimensional graphic image and a second input part inputs a second two-dimensional graphic image. A three-dimensional graphic image generating part generates a three-dimensional graphic image based on the first two-dimensional graphic image and the second two-dimensional graphic image.

28 Claims, 11 Drawing Sheets b=B(x,y)

$z = Z(r)$ $b = B(x,y)$

FIG. 6A
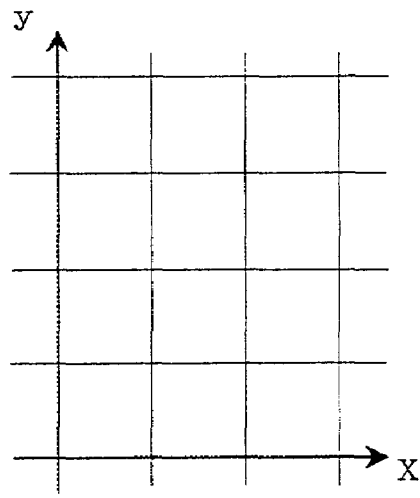
FIG. 6B
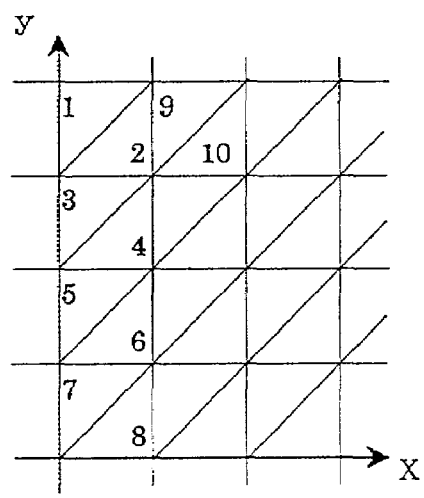
FIG. 6C
| $(0,0,Z_{00}), (1,0,Z_{10}), (0,1,Z_{01})$ |
| --- |
| $(1,0,Z_{10}), (0,1,Z_{01}), (1,1,Z_{11})$ |
| $(0,1,Z_{01}), (1,1,Z_{11}), (0,2,Z_{02})$ |
| $(1,1,Z_{10}), (0,2,Z_{02}), (1,2,Z_{12})$ |
| .......... |

LINE THROUGH
x=0 AND y=0

CONE OR QUADRILATERAL DYRAMIDS

LINE THROUGH
x=0 AND y=0
AND HORIZONTAL
LINE

TRAPEZOID HAVING ASLANT CUT-OFF
EDGES OR CONE CUTTING-OFF TOP

ONE QUARTER OF
CIRCLE AND
HORIZONTAL LINE

BOARD WITH ROUND ED OFF
CORNERS SHCH AS SHAPE OF
UPSIDE-DOWN TRAY

APPARATUS AND METHOD FOR PROCESSING THREE-DIMENSIONAL GRAPHIC IMAGES

BACKGROUND OF THE INVENTION

1. Field of the Invention

The present invention generally relates to apparatuses and methods for processing three-dimensional graphic images based on two-dimensional graphics data and computer-readable recording media thereof, and more particularly to an apparatus and a method for generating three-dimensional graphic images by inputs of a two-dimensional shape from a top plan view and a relationship between a distance and a height from an edge of the shape, and a computer-readable recording medium thereof.

Recently, since a personal computer has become widely used and has been miniaturized, a three-dimensional graphic image generating tool for the personal computer is desired for the general public to intuitively create three-dimensional graphic images instead of requiring special knowledge and skills or special apparatus.

2. Description of the Related Art

Conventionally, as a method for generating three-dimensional graphic images, a method indicating on three-dimensional coordinates each surface, each line and each point forming three-dimensional graphic images (a polygon wire frame method) and a method indicating whether or not each cube forms a part of a graphic in which method a set of cubes three-dimensionally divided represents space (a three-dimensional space applying a bitmap method) has been provided.

Another method indicating a space by simultaneous equations having x, y and z variables also has been provided. That is, in the method, a partial region to be transformed and a vector field function able to transform the partial region are indicated so that a transformed curved surface is generated by multiplying the vector field function by a transformation vector. The method is found in Japanese Laid-Open Patent Application No.62-26584.

Moreover, there is a method in which a transformation into a specific three-dimensional graphic image is indicated by a user's operation. That is, in addition to the above Japanese Laid-Open Patent Application No.62-26584, it is possible to review a display and determine an effective point, a transformation region, a direction of a transformation vector and a vector magnitude. The method is found in Japanese Laid-Open Patent Application No.7-49962 and No.7-49963.

Conventionally, the above methods realize the generation of three-dimensional graphic images.

However, the above conventional methods have the following disadvantages:

In the polygon wire frame method and a three-dimensional space applying a bitmap method, it is required to indicate three-dimensional coordinates by a user himself. Thus, it is difficult for the user to create three-dimensional graphic images. As a result, the user needs a special device to create the three-dimensional graphic images. For example, a motion capture device, a device for studying an uneven surface by using special gauges or a device for conducting a special process for images taken from two angles are used by the user.

In the method indicating a space by simultaneous equations having x, y and z variables, it is required for the user to make simultaneous equations for each graphic shape to be realized. Thus, it is required for the user to have high skills to search a considerable number of equations for the most preferable type of simultaneous equations and to make the simultaneous equations.

In the method in which a transformation into a specific three-dimensional graphic image is indicated by a user's operation, basic three-dimensional graphic data and functions for transformation operations must be included beforehand to refer to. In addition, it is required for the user to have high skills to search a considerable number of equations for the most preferable type of simultaneous equations and to make the simultaneous equations.

In the methods described in Japanese Laid-Open Patent Application No. 62-26584, No. 7-49962 and No. 7-49963, some sample functions are provided. However, a mechanism for automatically applying a graphic shape to a function is not included. Thus, the user has to make a new function when the user needs a different shape than can be generated by the sample functions.

In any one of the above conventional methods, it is impossible to convert a two-dimensional graphic drawn by freehand into a three-dimensional graphic image. Thus, it is also impossible for the user to intuitively create three-dimensional graphic images by using the above conventional methods.

The user has to have special skills or special devices and manage a large amount of data. Otherwise, since kinds of three-dimensional graphic images possible to create are limited to the user, it is an inconvenience for the user.

SUMMARY OF THE INVENTION

It is a general object of the present invention to provide an apparatus, a method and a computer-readable recording medium in which the above-mentioned problems are eliminated.

A more specific object of the present invention is to provide an apparatus and a method for generating three-dimensional graphic images by inputs of a two-dimensional shape from a top plan view and a relationship between a distance and a height from an edge of the shape, and a computer-readable recording medium thereof.

The above objects of the present invention are achieved by an apparatus for processing three-dimensional graphic images, said apparatus including: a first input part inputting a first two-dimensional graphic image; a second input part inputting a second two-dimensional graphic image; and a three-dimensional graphic image generating part generating a three-dimensional graphic image based on the first two-dimensional graphic image and the second two-dimensional graphic image, wherein the first two-dimensional graphic image is determined, or input, as a plan shape and the second two-dimensional graphic image is determined as a cross-sectional shape.

According to the above invention, it is possible to input data of a solid object by inputting two-dimensional data.

The above objects of the present invention are achieved by a computer-readable recording medium recorded with a program for causing a computer to process three-dimensional graphic images, said program comprising the codes of: (a) inputting a first two-dimensional graphic image; (b) inputting a second two-dimensional graphic image; and (c) generating a three-dimensional graphic image based on the first two-dimensional graphic image and the second two-dimensional graphic image, wherein the first two-dimensional graphic image is determined, or input, as a plan shape and the second two-dimensional graphic image is determined, or input, as a cross-sectional shape.

According to the above invention, it is possible to provide a method in which data of a solid object can be input by inputting two-dimensional data.

The above objects of the present invention are achieved by a method for processing three-dimensional graphic images, said method comprising the steps of: (a) inputting a first two-dimensional graphic image; (b) inputting a second two-dimensional graphic image; and (c) generating a three-dimensional graphic image based on the first two-dimensional graphic image and the second two-dimensional graphic image, wherein the first two-dimensional graphic image is determined, or input, as a plan shape and the second two-dimensional graphic image is determined, or input, as a cross-sectional shape.

According to the above invention, it is possible to provide a computer-readable recording medium recorded with a program for causing a computer to process three-dimensional graphic images in which data of a solid object can be input by inputting two-dimensional data.

BRIEF DESCRIPTION OF THE DRAWINGS

Other objects, features and advantages of the present invention will become more apparent from the following detailed description when read in conjunction with the accompanying drawings, in which:

FIG. 6A, FIG. 6B and FIG. 6C are diagrams for explaining another data format showing the shape of the three-dimensional graphic image according to the embodiment of the present invention;

DESCRIPTION OF THE PREFERRED EMBODIMENT

A description will now be given of an embodiment of the present invention.

The present invention can be applied to a rendering software product displaying three-dimensional graphic images activated on a personal computer.

Figure 1:
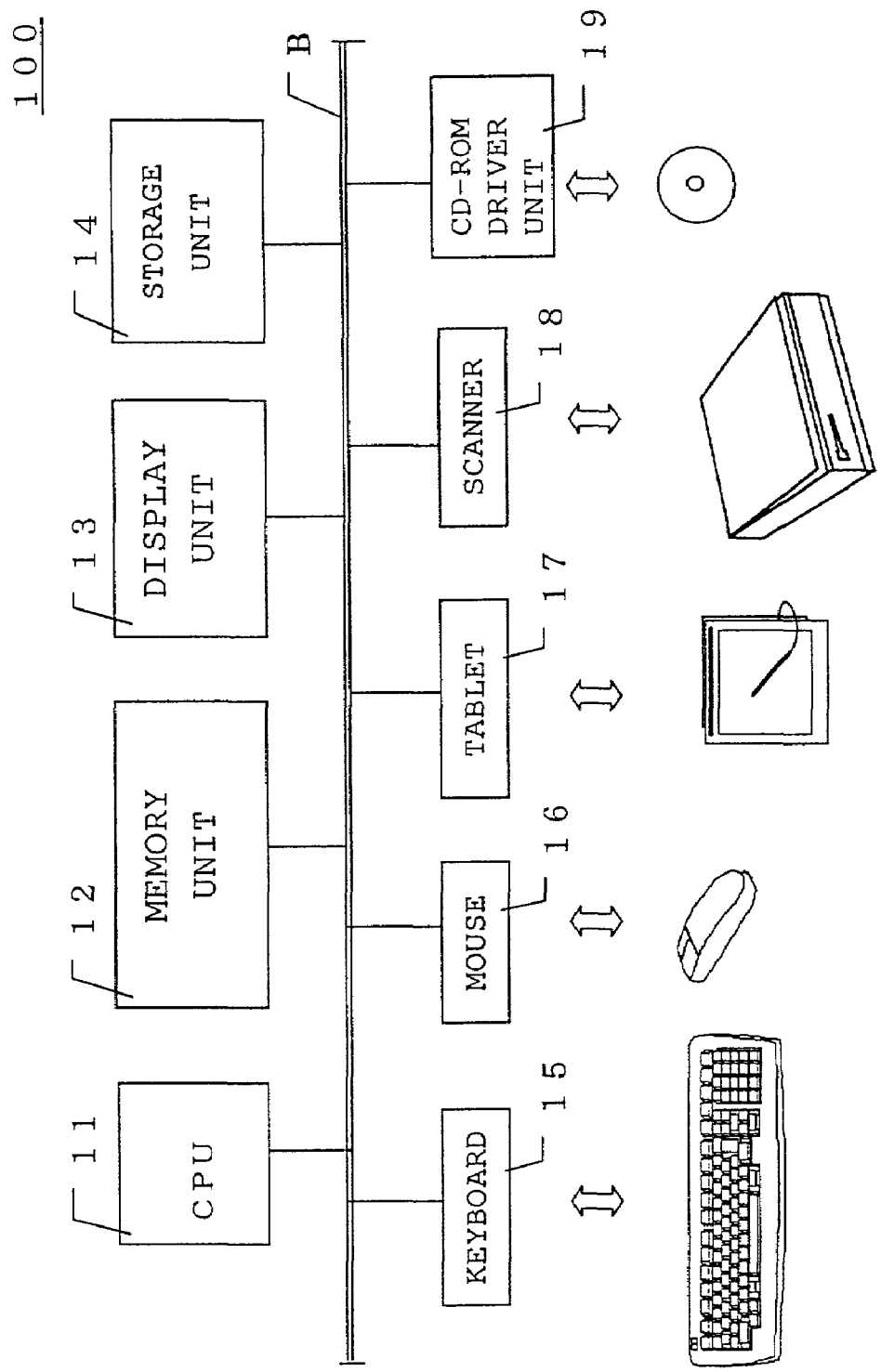
FIG. 1 is a diagram showing a hardware configuration according to an embodiment of the present invention.

FIG. 1 is a diagram showing a hardware configuration according to the embodiment of the present invention.

As shown in FIG. 1, a graphic image processing apparatus 100 includes a CPU (Central Processing Unit) 11 for executing a three-dimensional generating program, a memory unit 12 for temporarily storing the three-dimensional generating program or data, a display unit 13 for controlling information to display, a storage unit 14 for loading the three-dimensional generating program and data to execute, and a keyboard 15, a mouse 16, a tablet 17 and a scanner 18 for inputting data or an image necessary to generate a graphic, and a CD-ROM driver unit 19 to load the three-dimensional generating program, data and images recorded in a CD-ROM 20, all of which are connected together through a bus B. It should be noted that a recording medium is not limited to the CD-ROM 20, but another computer-readable recording medium such as a magnetic disk, a magnetic tape, an optical disk, a magneto-optical disk, a semiconductor memory or the like may be used.

A functional configuration realizing generation of the three-dimensional graphic images will now be described.

In a method for generating three-dimensional graphic images according to the present invention, a paint tool and a graph generating tool are used. That is, a three-dimensional graphic image is generated based on a shape of top plan view (or a shape of bottom plan view) of a solid object input by using the paint tool and an edge form of the graphic input by using the graph generating tool. Then, data of the generated three-dimensional graphic image is recognized as shape data of components used for rendering and the generated three-dimensional graphic image is displayed.

Figure 2:
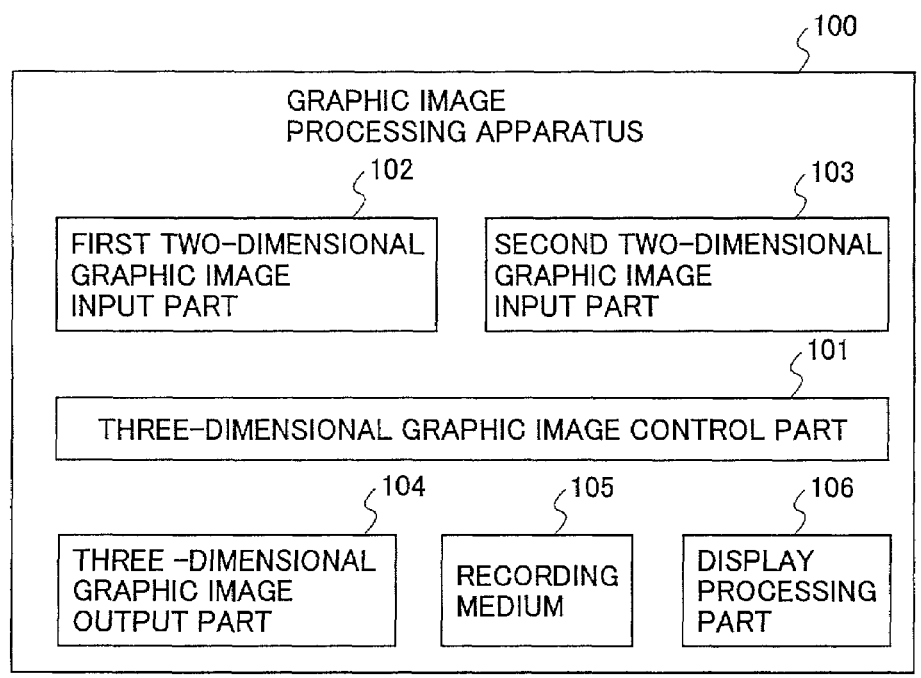
FIG. 2 is a block diagram showing the functional configuration according to the present invention.

FIG. 2 is a block diagram showing the functional configuration according to the present invention.

As shown in FIG. 2, the graphic image processing apparatus 100 includes a three-dimensional graphic image control part 101, a first two-dimensional graphic image input part 102 for inputting a shape of a top plan view as a two-dimensional graphic, a second two-dimensional graphic image input part 103 for inputting a shape formed by a distance from an edge and a height at the distance, a three-dimensional graphic image output part 104 for outputting a three-dimensional graphic image, a recording medium 105 for storing functions and graphics data necessary to generate the three-dimensional graphic image, and a display processing part 106 for displaying three-dimensional graphic images.

The three-dimensional graphic image control part 101 generates the three-dimensional graphic image based on the shape of top plan view (or the shape of bottom plan view) input by the first two-dimensional graphic image input part 102 and the shape formed by the distance from the edge and the height at the distance input by the second two-dimensional graphic image input part, and controls the three-dimensional graphic image output part 104 to output a generated three-dimensional graphic image.

The three-dimensional graphic image control part 101 controls modification and display of the three-dimensional graphic image in real time when the input two-dimensional shape is changed by the first two-dimensional graphic image input part 102 or the second two-dimensional graphic image input part 103.

The first two-dimensional graphic image input part 102 converts a shape of a top plan view input by the mouse 16, the tablet 17, a scanner 18, or the CD-ROM driver 19 by using a paint tool, into a two-dimensional graphic image data. For example, the first two-dimensional graphic image input part 102 converts into a bitmap function b=B(x, y) expressed by variables x and y. Also, the first two-dimensional graphic image input part 102 can process one of existing two-dimensional graphic image data files that a user has selected.

That is, the user selects the paint tool from a menu and inputs a shape of a top plan view of a solid object. The shape of the top plan view is converted into the two-dimensional graphic image data by the first two-dimensional graphic image input part 102 and then displayed in a three-dimensional space.

The second two-dimensional graphic image input part 103 converts data expressed by the distance from the edge of the shape of the top plan view input by the first two-dimensional graphic image input part 102 and the height at the distance, which distance and height are input by the keyboard 15, the mouse 16 and the tablet 17, into two-dimensional graphic image data. For example, the second two-dimensional graphic image input part 103 converts the data into a graph function z=Z(r) expressed by a variable r. Also, the second two-dimensional graphic image input part 103 can process one of existing two-dimensional graphic image data files that a user has selected.

That is, the user selects one of shapes of a top plan view, which one is input by using the paint tool, and selects one of graph tools from the menu. Then, when the user inputs a graph showing a relationship between the distance from the edge of the shape of the top plan view and the height corresponding to the distance, the input graph is converted into the two-dimensional graphic image data by the second two-dimensional graphic image input part 103. After that, the three-dimensional graphic image control part 101 generates a solid graphic image based on the two-dimensional graphic image data converted from the shape of top plan view and data obtained by the graph function, and displays the solid graphic image at the display unit 13.

The three-dimensional graphic image output part 104 displays the two-dimensional graphic image controlled by the three-dimensional graphic image control part 101 in a space on the display unit 13, and outputs the solid graphic image generated from three-dimensional graphic image data.

The recording medium 105 is used to store basic functions and graphic image data necessary to process the three-dimensional graphic images. The recording medium 105 is also used to store functions or array data generated during the processing of the three-dimensional graphic image.

Various kinds of graphs available to use to indicate the relationship between the distance from the edge and height at the distance can be stored as samples in the recording medium 105, beforehand. For example, by using a function expressing one quarter of circle, it is possible to generate a three-dimensional cartoon character image which edge is round, swollen and fleecy, from a cartoon illustration. It is also possible to generate a character font which edge is round and swollen. Moreover, it is possible to easily generate a three-dimensional graphic design image from two-dimensional design data.

The display processing part 106 displays the three-dimensional graphic image data controlled by the three-dimensional graphic image output part 104.

In the graphic image processing apparatus 100, when it is needed to change the solid graphic image, either one of the shape of the top plan view and the relationship between the distance from the edge and the height is simply changed so as to change the three-dimensional graphic image.

When the shape of the top plan view is changed, it is not required to change the relationship between the distance from the edge and the height. On the other hand, when the relationship between the distance from the edge and the height is changed, it is not required to change the shape of the top plan view.

According to the present invention, the two-dimensional graphic image is updated based on input data of change and the solid graphic image is updated immediately when either one of the shape of top plan view and the relationship between the distance from the edge and the height is changed. Therefore, the user can change a form of the solid graphic image in real time while confirming the form of the solid graphic image.

Also, in the method for generating the three-dimensional graphic images according to the present invention, three-dimensional graphic image data given as polygon data can be used to generate and display the three-dimensional graphic image.

Data formats for the two-dimensional graphic image and the three-dimensional graphic image will now be described.

Figure 3A:
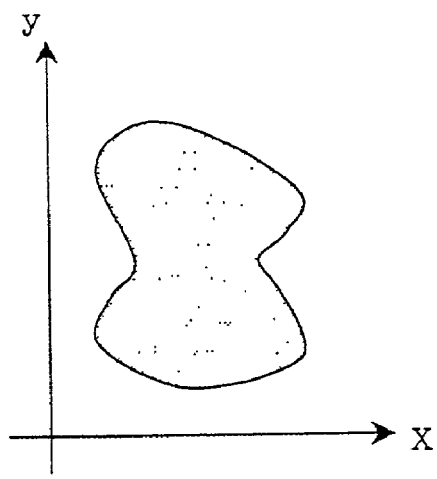
FIG. 3A, FIG. 3B and FIG. 3C are diagrams showing a top plan view of a solid object according to the embodiment of the present invention.
Figure 3B:
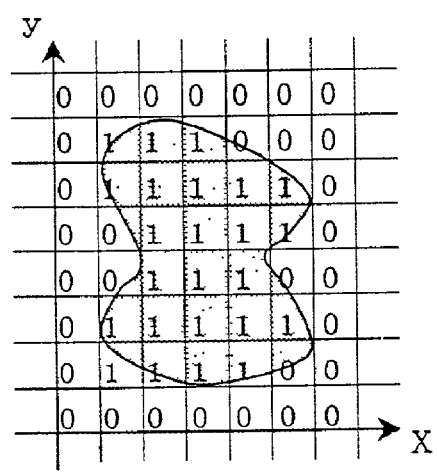
Figure 3C:
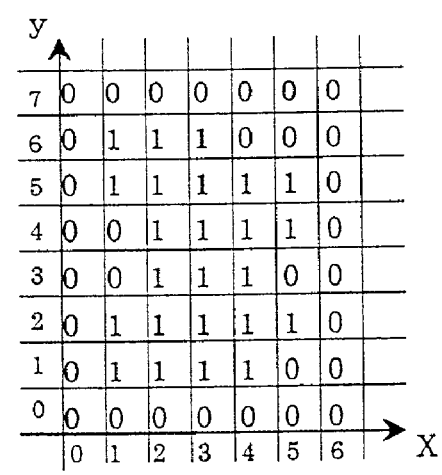

FIG. 3A, FIG. 3B and FIG. 3C are diagrams showing a top plan view of a solid object according to the embodiment of the present invention.

FIG. 3A is a diagram showing a data format for the shape of the plan view projected on a two-dimensional coordinates of the x-axis and y-axis according to the embodiment of the present invention.

The first two-dimensional graphic image input part 102 converts the shape of the top plan view of the solid object into the two-dimensional bitmap data and then develops the two-dimensional bitmap data into the two-dimensional coordinates of the x-axis and y-axis.

FIG. 3B is a diagram showing the shape projected on the two-dimensional coordinates that are segmented by grids.

The first two-dimensional graphic image input part 102 segments the space and converts the segmented space into data indicating whether or not each grid includes a part of the solid. For example, the first two-dimensional graphic image input part 102 converts to 0 (zero) when a grid does not include the part of the solid. On the other hand, the first two-dimensional graphic image input part 102 converts to 1 when the grid includes the part of the solid.

To recognize a solid part, bitmap data having color data and density data is generally used. It is possible to recognize the solid part by recognizing a specific color or density part. For example, when a color bitmap is given, all parts except for color parts are regarded as parts of the solid. When a density bitmap is given, all parts except for density 0 (zero) are regarded as parts of the solid.

FIG. 3C is a diagram showing presence of the part of the solid in each grid as bitmap data.

The first two-dimensional graphic image input part 102 converts the presence of the part of the solid into two-dimensional bitmap data. For example, converted data can be represented by a function b=B(x, y) or the like.

Figure 4A:
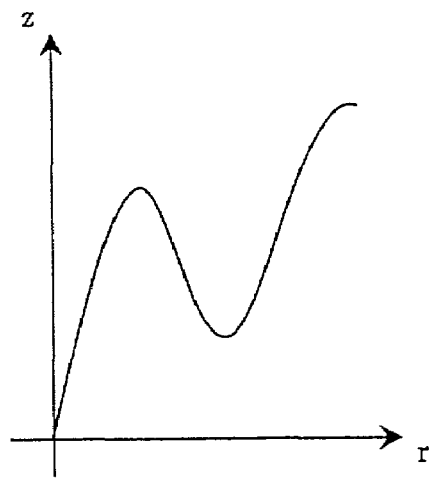
FIG. 4A, FIG. 4B and FIG. 4C are diagrams for explaining a data format showing a distance from an edge of the solid and the height at the distance, according to the embodiment of the present invention.
Figure 4B:
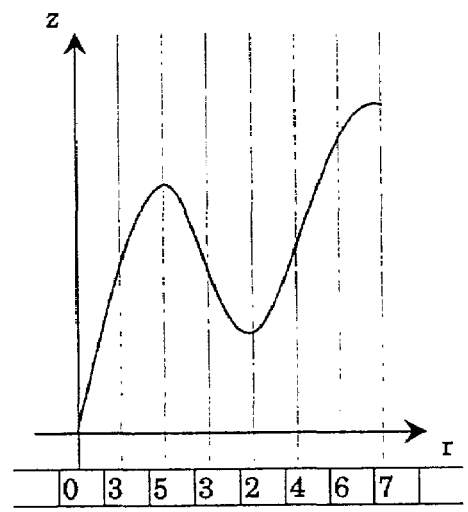
Figure 4C:
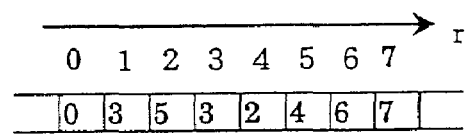

FIG. 4A, FIG. 4B and FIG. 4C are diagrams for explaining a data format showing a distance from an edge of the solid and height at the distance, according to the embodiment of the present invention.

FIG. 4A is a diagram showing a distance from the edge of the solid and the height at the distance, which distance and height are projected on two-dimensional coordinates of a z-axis and a r-axis.

The second two-dimensional graphic image input part 103 develops the shape to the two-dimensional coordinates of the z-axis and r-axis so as to convert the relationship of distance from the edge of the solid and height into array data in a single dimension.

FIG. 4B is a diagram showing the shape projected on the coordinates divided by grids.

The second two-dimensional graphic image input part 103 divides the space by grids and regards height for each grid, that is, a value in a z-axis direction, as data.

FIG. 4C is a diagram showing the distance from the edge of the solid and height at the distance as data.

The second two-dimensional graphic image input part 103 converts the shape into single dimensional array data.

The array data can be extracted by a function and bitmap data. For example, when a function is given, the array data can be created by obtaining a function value for each grid. When the bitmap data is given, the array data can be created by choosing a y-value of the solid at a maximum y-value for each x-value.

Figure 5A:
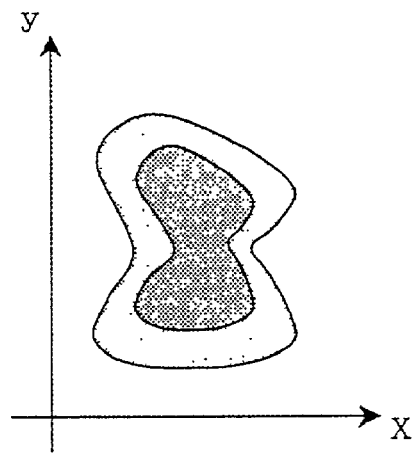
FIG. 5A, FIG. 5B and FIG. 5C are diagrams for explaining a data format showing a shape of the three-dimensional graphic image according to the embodiment of the present invention.
Figure 5B:
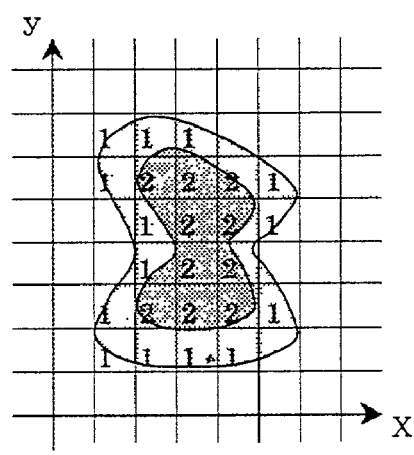
Figure 5C:
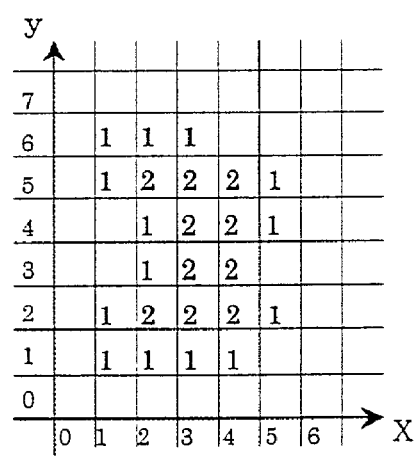

FIG. 5A, FIG. 5B and FIG. 5C are diagrams for explaining a data format showing a shape of the three-dimensional graphic image according to the embodiment of the present invention.

FIG. 5A is a diagram showing the shape of the top plan view of the solid object, which shape is projected on the two-dimensional coordinates of the x-axis and y-axis.

The three-dimensional graphic image control part 101 develops the shape of the top plan view of the solid object using the two-dimensional coordinates of the x-axis and y-axis.

FIG. 5B is a diagram showing the shape projected onto coordinates divided by grids.

The three-dimensional graphic image control 101 divides the space into grids and inputs height data of the solid at a position corresponding to each grid. When there is no part of the solid in a grid, the three-dimensional graphic image control 101 inputs information indicating that the part of the solid does not exist.

FIG. 5C is a diagram showing height data of the solid for each grid as bitmap data.

The three-dimensional graphic image control part 101 converts the height data of the solid into the two-dimensional bitmap data. For example, converted data can be expressed by a function b=B(x, y) or the like.

The data format for the three-dimensional graphic image as shown in FIG. 5C can not be used when the height does not uniquely corresponds to x and y coordinates because of rotation. Therefore, a more practical method for converting to a polygon will now be described.

FIG. 6A, FIG. 6B and FIG. 6C are diagrams for explaining another data format showing the shape of the three-dimensional graphic image according to the embodiment of the present invention.

As shown in FIG. 6A, at first, the two-dimensional coordinates are divided by grids.

Next, as shown in FIG. 6B, each grid is slantingly divided into two so as to create a set of triangles. A triangle, which is formed by connecting three heights corresponding to vertices of the triangle created by the division, is a flat plane. Thus, the triangle can be used as polygon data. The three-dimensional graphic image control 101 obtains the height corresponding to vertices of the triangle as data.

Consequently, as shown in FIG. 6C, for example, coordinates values are obtained in an order from a left bottom so as to make data.

The three-dimensional graphic image control part 101 expresses x-y plane coordinates values and height Z as (i, j, $Z_{ij}$) from a point of x=0 and y=0 as a beginning point and then creates a data format where three values of vertices of each triangle is a single set.

A method for generating a three-dimensional graphic image according to the present invention will now be explained.

In a method for generating three-dimensional graphic image according to the present invention, an interior point and an exterior point of the shape of the top plan view are obtained. In addition, a minimum distance between the interior point and the exterior point and a height at the interior point are obtained so as to realize the three-dimensional graphic image.

Figure 7:
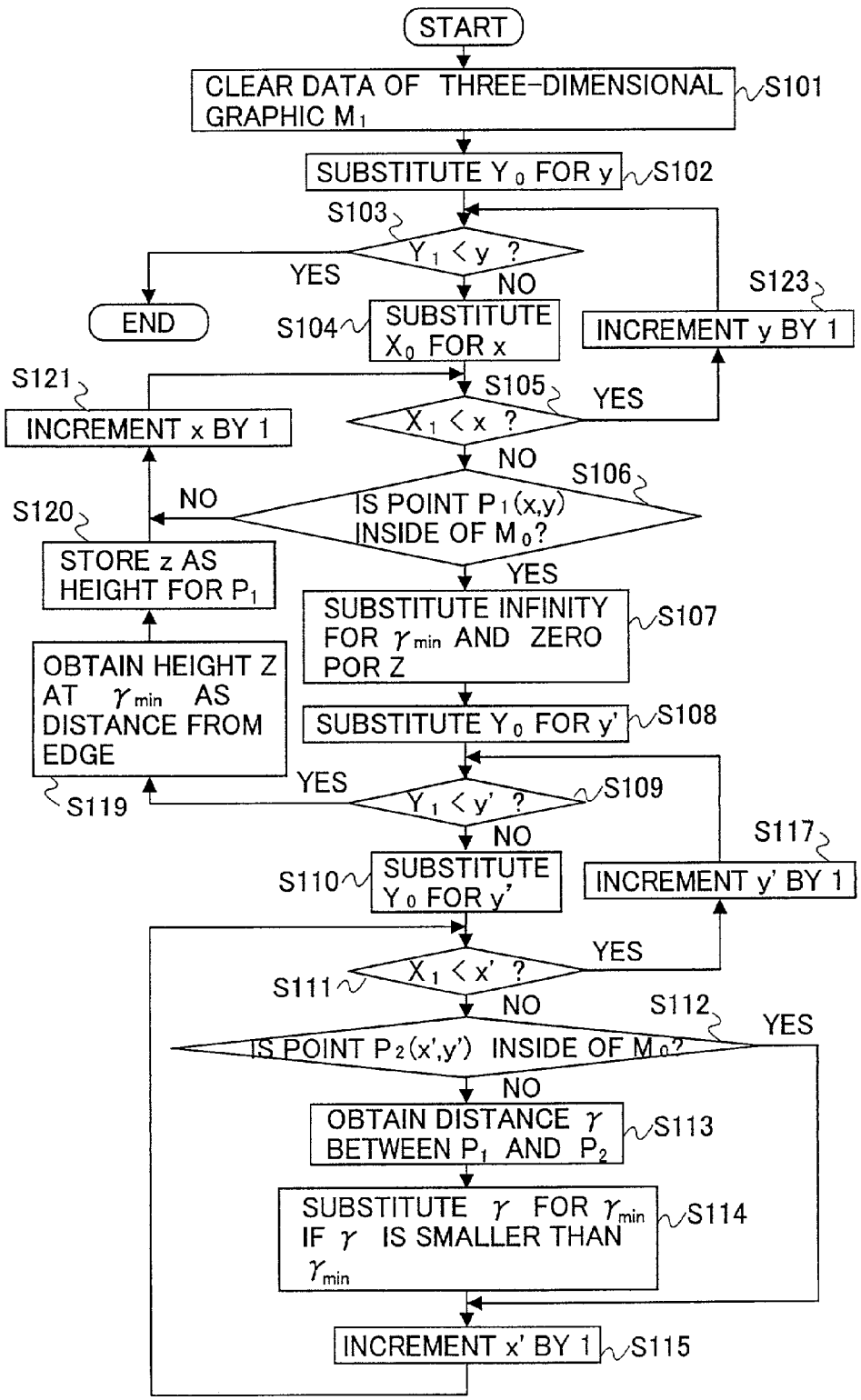
FIG. 7 is a flowchart diagram for explaining the method for generating the three-dimensional graphic image according to the present invention.

FIG. 7 is a flowchart diagram for explaining the method for generating the three-dimensional graphic image according to the present invention.

In the method for generating three-dimensional graphic image according to the present invention, the shape of the top plan view of a solid object is denoted by $M_0$ and the relationship between the distance from the edge of the shape and the height at the distance is denoted by z. $M_0$ is given by the bitmap function B(x, y) and z is given by the array Z(r). As a result, $M_1$ is obtained as a three-dimensional graphic image and is also given by a two-dimensional array F(x, y).

A range of the shape $M_0$ of the top plan view is obtained and minimum value ($x_0$, $y_0$) and maximum value ($x_1$, $y_1$) of x and y are determined.

As shown in FIG. 7, in step S101, for clearing data of the three-dimensional graphic image $M_1$, the data is cleared off and the whole F(x, y) is defined as zero.

In step S102 for substituting $Y_0$ for y, y is set to an initial value $Y_0$.

In step S103 for checking whether or not $Y_1$<y, it is checked whether or not y exceeds a maximum value $Y_1$. When y exceeds the maximum value $Y_1$, this process is terminated. When y does not exceed the maximum value $Y_1$, the process goes to step S104.

In the step S104 for substituting $X_0$ for x, x is set to an initial value $X_0$.

In step S105 for checking whether or not $X_1$<x, it is checked whether or not x exceeds a maximum value $X_1$. When x exceeds the maximum value $X_1$, y is incremented by 1 (step S123) and the process goes back to the step S103. When x does not exceed the maximum value $X_1$, the process goes to step S106.

In the step S106 for checking whether or not a point $P_1$(x, y) is an interior point of $M_0$, it is checked whether or not $P_1$ is denoted by the point (x, y) and it is checked whether or not $P_1$ is the interior point of $M_0$. That is, $P_1$ is located inside of $M_0$ when a value of the bitmap function B(x, y) shown in FIG. 3C is not equal to zero. On the other hand, $P_1$ is located outside of $M_0$ when the value of the bitmap function B(x, y) is equal to zero. Thus, when $P_1$ is inside of $M_0$, the process goes to step S107. When $P_1$ is outside of $M_0$, x is incremented by 1 (step S121) and then the process goes back to the step S105.

In the step S107 for substituting an infinite value for $r_{min}$, $r_{min}$ and z are initialized. $r_{min}$ is set to an infinite value and z is set to zero.

In step S108 for substituting $Y_0$ for y', y' is set to $Y_0$.

In step S109 for checking whether or not $Y_1 < y'$, it is checked whether or not $y'$ exceeds the maximum $Y_1$. When $y'$ exceeds the maximum $Y_1$, the process goes to step S119. When $y'$ does not exceed the maximum $Y_1$, the process goes to step S110.

In the step S110 for substituting $X_0$ for $x'$, $x'$ is set to the initial value $X_0$.

In step S111 for checking whether or not $x_1 < x'$, it is checked whether or not $x'$ exceeds the maximum value $X_1$. When $x'$ exceeds the maximum value $X_1$, $y'$ is incremented by 1 (step S117) and then the process goes back to the step S109. When $x'$ does not exceed the maximum value $X_1$, the process goes to step S112.

In the step S112 for checking whether or not a point $P_2(x', y')$ is inside of $M_0$, $P_2$ is denoted by a point $(x', y')$ and it is checked whether or not $P_2$ is inside of $M_0$. That is, $P_2$ is located inside of $M_0$ when a value of the bitmap function $B(x', y')$ shown in FIG. 3C is not equal to zero. On the other hand, $P_2$ is located outside of $M_0$ when the value of the bitmap function $B(x', y')$ is equal to zero. When $P_2$ is located inside of $M_0$, $x'$ is incremented by 1 (step S115) and then the process goes back to the step S111. When $P_2$ is located outside of $M_0$, the process goes to step S113.

In the step S113 for obtaining a distance between $P_1$ and $P_2$, the distance r between $P_1$ being inside of $M_0$ and $P_2$ being outside of $M_0$ is obtained.

$$r = \sqrt{(x-x')^2 + (y-y')^2} \quad \text{[expression 1]}$$

In step S114 for substituting r for $r_{min}$, when r is less than $r_{min}$, $r_{min}$ is set to r. On the other hand, when r is greater than $r_{min}$, $r_{min}$ is maintained. Then, $x'$ is incremented by 1 (step S115) and the process goes back to the step S111.

In step S119 for obtaining the height z, $r_{min}$ is defined as the distance from the edge and then the height z at $r_{min}$ is obtained by the following function:

$$z \leftarrow Z(r_{min}).$$

In step S120 for defining z as a height corresponding to $P_1$, z is stored as the height corresponding to $P_1$.

$$F(x, y) \leftarrow z$$

A result of the process in accordance with the flowchart described above is output as a result of the function $F(x, y)$.

Examples of three-dimensional curved surfaces according to the present invention will now be described with reference to FIGS. 8A, 8B and 8C, FIGS. 9A, 9B and 9C, and FIGS. 10A, 10B and 10C. It should be noted that a shape and size in each figure A are the same as an edge shape and size of bottom plan view in each figure C, respectively.

Figure 8A:
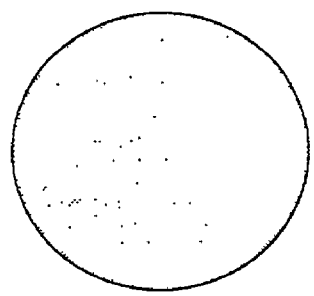
FIG. 8A is a diagram illustrating a shape of the top plan view.
Figure 8B:
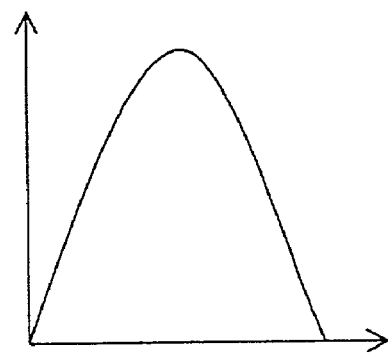
FIG. 8B is a graph showing a relationship between the distance from edge and the height at the distance.
Figure 8C:
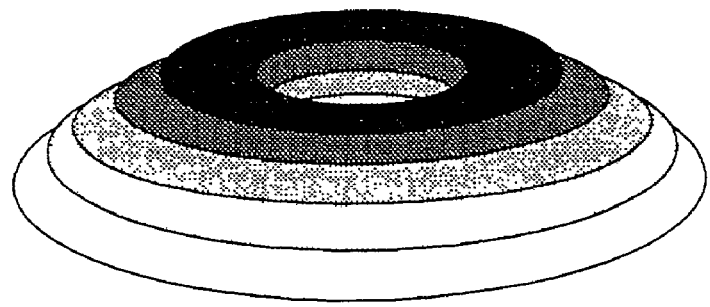
FIG. 8C is a diagram showing a three-dimensional curved surface.

FIGS. 8A, 8B and 8C are diagrams illustrating a three-dimensional curved surface according to the present invention (part 1).

FIG. 8A is a diagram illustrating a shape of the top plan view. In FIG. 8A, a status in which a circle shape is input by the first two-dimensional graphic image input part 102 shown in FIG. 2 is illustrated.

FIG. 8B is a graph showing a relationship between the distance from an edge and the height at the distance. Another status in which the relationship between the distance from the edge and the height at the distance is input by the second two-dimensional graphic image input part 103 shown in FIG. 2 is illustrated as a convex curve graph.

FIG. 8C is a diagram showing a three-dimensional curved surface. In FIG. 8C, the three-dimensional curved surface is generated based on the shape shown in FIG. 8A and the graph shown in FIG. 8B. Consequently, a doughnut shaped three-dimensional curved surface is generated from the circle shape in FIG. 8A.

Figure 9A:
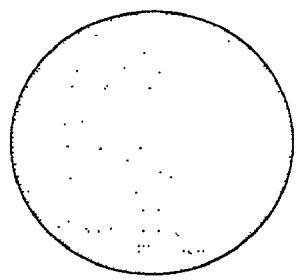
FIG. 9A is a diagram illustrating a shape of the top plan view.
Figure 9B:
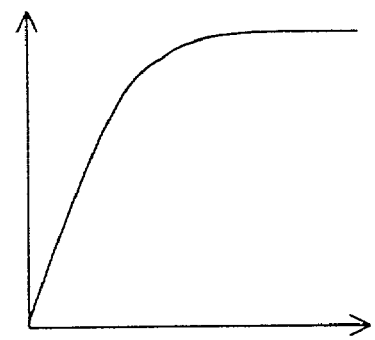
FIG. 9B is a graph showing another relationship between the distance from an edge and the height at the distance.
Figure 9C:
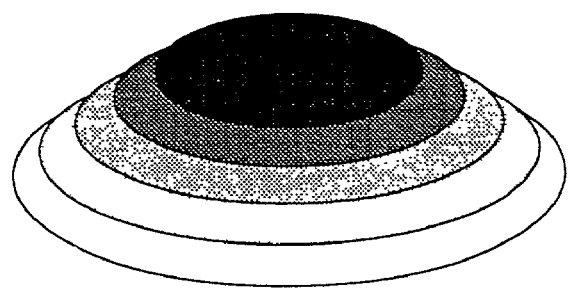
FIG. 9C is a diagram showing another three-dimensional curved surface.

FIGS. 9A, 9B and 9C are diagrams illustrating a three-dimensional curved surface according to the present invention (part 2).

FIG. 9A is a diagram illustrating a shape of the top plan view. In FIG. 9A, a status in which the same circle shape in FIG. 8A is input by the first two-dimensional graphic image input part 102 in FIG. 2 is illustrated.

FIG. 9B is a graph showing another relationship between the distance from an edge and the height at the distance. Another status in which the relationship between the distance from the edge and the height at the distance is input by the second two-dimensional graphic image input part 103 shown in FIG. 2 is illustrated as a graph drawn by curves and horizontal lines.

FIG. 9C is a diagram showing another three-dimensional curved surface. In FIG. 9C, the three-dimensional curved surface is generated based on the shape shown in FIG. 9A and the graph shown in FIG. 9B. Consequently, a trapezoid shaped three-dimensional curved surface is generated from the circle shape in FIG. 9A.

Figure 10A:
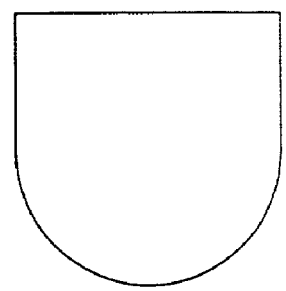
FIG. 10A is a diagram illustrating a shape of a top plan view of another solid object.
Figure 10B:
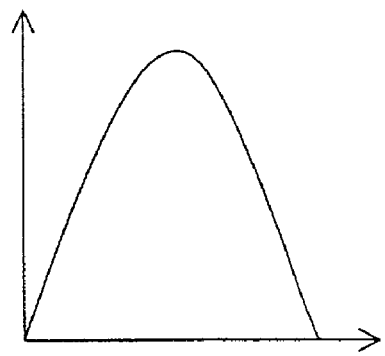
FIG. 10B is a graph showing another relationship between the distance from an edge and the height at the distance.
Figure 10C:
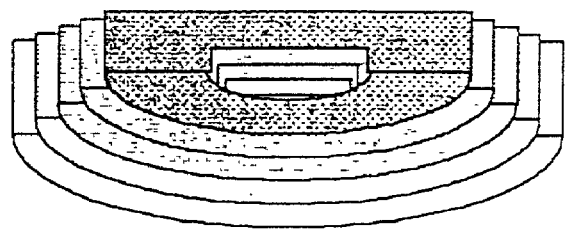
FIG. 10C is a diagram showing another three-dimensional curved surface.

FIGS. 10A, 10B and 10C are diagrams illustrating a three-dimensional curved surface according to the present invention (part 3).

FIG. 10A is a diagram illustrating a shape of a top plan view of another solid object. In FIG. 10A, a status in which a shape such that the same circle shape in FIG. 8A and a square shape are jointed is input by the first two-dimensional graphic image input part 102 in FIG. 2 is illustrated.

FIG. 10B is a graph showing another relationship between the distance from an edge and the height at the distance. Another status in which the relationship between the distance from an edge and the height at the distance is input by the second two-dimensional graphic image input part 103 shown in FIG. 2 is illustrated as a convex curve graph.

FIG. 10C is a diagram showing another three-dimensional curved surface. In FIG. 10C, the three-dimensional curved surface is generated based on the shape shown in FIG. 10A and the graph shown in FIG. 10B. Consequently, another doughnut shaped three-dimensional curved surface, one of which lateral faces is oblique and flat, is generated from the shaped which joints the circle shape and the square shape together.

Moreover, examples, in which the method for generating a three-dimensional graphic image according to the present invention is applied to letters, will now be described.

Figure 11A:
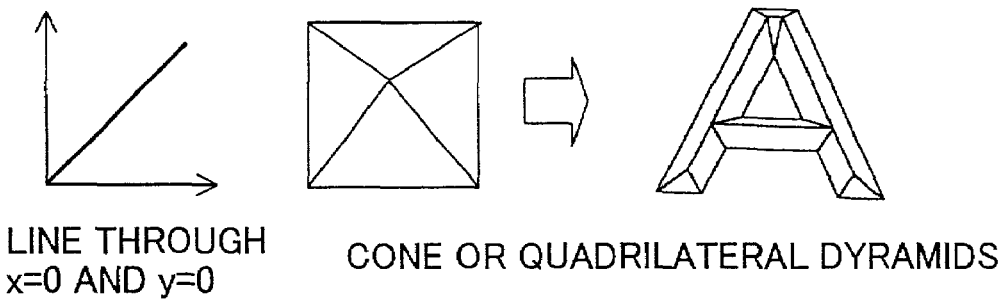
FIGS. 11A, 11B and 11C are diagrams illustrating solid shapes in that the method for generating a three-dimensional graphic image is applied to letters.
Figure 11B:
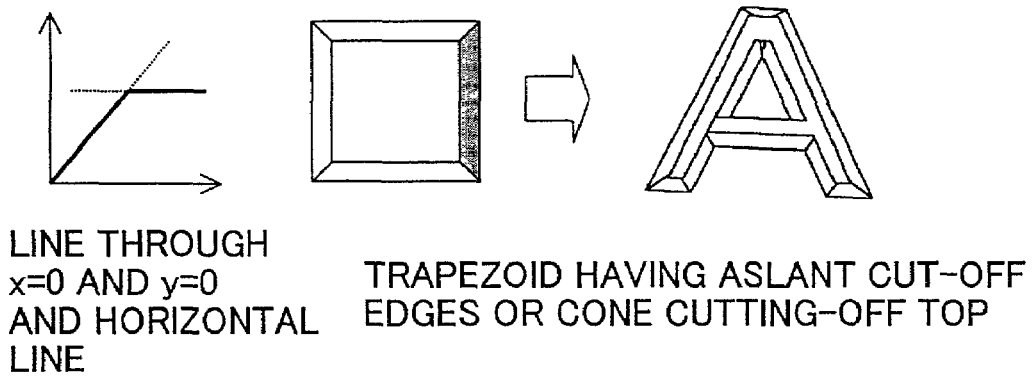
Figure 11C:
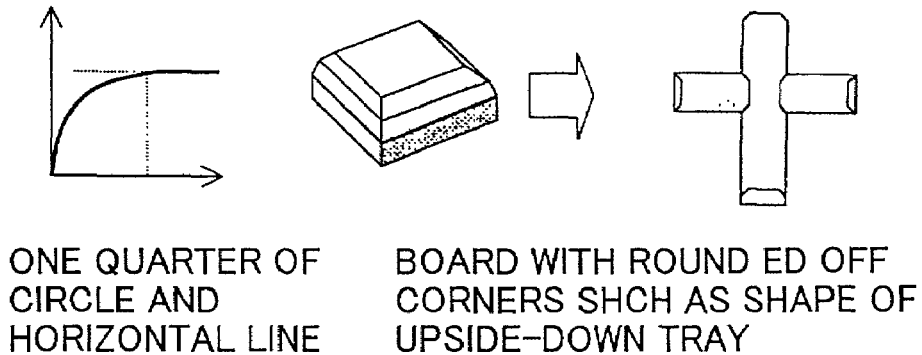

FIGS. 11A, 11B and 11C are diagrams illustrating solid shapes where the method for generating a three-dimensional graphic image is applied to letters.

In FIG. 11A, the three-dimensional graphic image control part 101 generates a cone or a quadrilateral pyramid based on a line through x=0 and y=0 generated based on data input by the second two-dimensional graphic image input part 103 and a square generated based on data input by the first two-dimensional graphic image input part 102. Moreover, the three-dimensional graphic image control part 101 can apply the generated cone or quadrilateral pyramid to a capital letter "A".

In FIG. 11B, the three-dimensional graphic image control part 101 generates a trapezoid having aslant cut-off edges or a cone cutting-off top based on a graph combining a line through x=0 and y=0 with a horizontal line generated based on data input by the second two-dimensional graphic image input part 103 and a square generated based on data input by the first two-dimensional graphic image input part 102.

Moreover, the three-dimensional graphic image control part 101 can apply the generated trapezoid and cone to a capital letter "A".

In FIG. 11C, the three-dimensional graphic image control part 101 generates a board with rounded off corners, such as a shape of an upside-down tray, based on a graph combining one quarter of circle with a horizontal line generated based on data input by the second two-dimensional graphic image input part 103 and a square generated based on data input by the first two-dimensional graphic image input part 102. Moreover the three-dimensional graphic image control part 101 can apply the generated board and cone to a "+" symbol.

It should be noted that the following equations are used in FIGS. 11A, 11B and 11C.

$$x = y \qquad \text{[expression 2]}$$

$$\begin{cases} x = y & (x \leq 1) \\ y = 1 & (1 < x) \end{cases} \text{for} \qquad \text{FIG.11B}$$

$$\begin{cases} x = \sqrt{1-x^2} & (0 \leq x \leq 1) \\ y = 1 & (1 < x) \end{cases} \text{for} \qquad \text{FIG.11C}$$

As described above, in any case, a two-dimensional graphic image is input. Thus, a general image input part or image creating part for a two-dimensional graphic image, such as a conventional paint tool, or graph generating tool can be used. In addition, an existing two-dimensional graphic image or a two-dimensional graphic image drawn by freehand can be used. Therefore, the conventional special device, the library for three-dimensional graphic image data or a transforming part, or the conventionally required high skills is not required and it is possible to simplify generating a three-dimensional graphic image. Also, it is possible for a user to change a shape and to simultaneously confirm an output result.

Moreover, according to the present invention, special knowledge and skills are not required for the user to make a graph for the two-dimensional graphic image and it is possible for the user to make the three-dimensional graphic image by inputting basic two-dimensional graphic images.

In addition, a basic three-dimensional graphic image and special functions for transforming the shape thereof are not required for the user. Thus, it is possible to simplify the method for generating the three-dimensional graphic image.

Also, special skills for converting the two-dimensional graphic image to data are not required for the user. It is possible for the user to draw by freehand the graph showing the relationship between the distance from the edge of the shape of the top plan view of the solid object and the height at the distance, and to input the graph as a cross-sectional shape.

It should be noted that three-dimensional graphic image data generated by the present invention can have a data format for exchanging with another program. Thus, the three-dimensional graphic image data is not limited to the rendering software according to the present invention, but can apply to another system such as a CAD (Computer Aided Design) system.

The present invention is not limited to the specifically disclosed embodiments, variations and modifications, and other variations and modifications may be made without departing from the scope of the present invention.

The present application is based on Japanese Priority Application No. 2000-210278 filed on Jul. 11, 2000, the entire contents of which are hereby incorporated by reference.

What is claimed is:

1. An apparatus for processing three-dimensional graphic images, said apparatus comprising:
   a first input part inputting a first two-dimensional graphic image input by a user;
   a second input part inputting a second two-dimensional graphic image input by a user; and
   a three-dimensional graphic image generating part generating a three-dimensional graphic image based on the first two-dimensional graphic image and the second two-dimensional graphic image,
   wherein the first two-dimensional graphic image is input as a plan shape and the second two-dimensional graphic image is input as a cross-sectional shape defining a relationship between distances measured from an edge of said plan shape, which plan shape is input by said first input part, and respective heights at the measured distances.

2. The apparatus as claimed in claim 1, wherein:
   said second two-dimensional graphic image, input by said second input part, defines a cross-sectional shape shown in distance and height coordinates; and
   said three-dimensional graphic image generating part corresponds a minimum distance, between a given position in said plan shape and the edge of said plan shape, to the distance coordinate of said cross-sectional shape, the height obtained by the distance coordinate of the cross-sectional shape being defined as a height at the given position in said plan shape.

3. The apparatus as claimed in claim 1, wherein said second input part is a graph generating program generating a graph showing a relationship between a distance from an edge of said plan shape and a height at the distance.

4. The apparatus as claimed in claim 1, wherein said first input part and said second input part are programs, each generating a respective two-dimensional graph image.

5. A method for processing three-dimensional graphic images, said method comprising:
   first inputting a first two-dimensional graphic image input by a user;
   second inputting a second two-dimensional graphic image input by a user; and
   generating a three-dimensional graphic image based on the first two-dimensional graphic image and the second two-dimensional graphic image,
   wherein the first two-dimensional graphic image is input as a plan shape and the second two-dimensional graphic image is input as a cross-sectional shape defining a relationship between distances measured from an edge of said plan shape, which plan shape is input by said inputting a first two-dimensional image, and respective heights at the measured distances.

6. The method as claimed in claim 5, wherein:
   said two-dimensional graphic image, input by said first inputting, defines a cross-sectional shape shown in distance and height coordinates;
   said inputting a second two-dimensional graphic image corresponds a minimum distance, between a given position in said plan shape and the edge of said plan shape, to the distance coordinate of said cross-sectional shape, the height obtained by the distance coordinate of the cross-sectional shape being defined as a height at the given position in said plan shape.

7. The method as claimed in claim 5, wherein said second inputting is performed by a graph generating program generating a graph showing a relationship between a distance from an edge of said plan shape and a height at the distance.

8. The method as claimed in claim 5, wherein said first inputting and said second inputting are programs each generating a respective two-dimensional graphic image.

9. A computer-readable recording medium storing a program controlling a computer to process three-dimensional graphic images, by:
 first inputting a first two-dimensional graphic image input by a user;
 second inputting a second two-dimensional graphic image input by a user; and
 generating a three-dimensional graphic image based on the first two-dimensional graphic image and the second two-dimensional graphic image,
 wherein the first two-dimensional graphic image is input as a plan shape and the second two-dimensional graphic image is input as a cross-sectional shape defining a relationship between distances measured from an edge of said plan shape, and respective heights at the measured distances.

10. The computer-readable recording medium as claimed in claim 9, wherein:
 said second two-dimensional graphic image input by said second inputting defines a cross-sectional shape shown in distance and height coordinates; and
 said generating corresponds a minimum distance, between a given position in said plan shape and the edge of said plan shape, to the distance coordinate of said cross-sectional shape, so that the height obtained by the distance coordinate of the cross-sectional shape is defined as a height at the given position in said plan shape.

11. The computer-readable recording medium as claimed in claim 9, wherein said second inputting is a graph generating program generating a graph showing a relationship between a distance from an edge of said plan shape and a height.

12. The computer-readable recording medium as claimed in claim 9, wherein said first inputting and said second inputting are programs, each generating a respective two-dimensional graph image.

13. A computer-readable storage medium storing a program controlling a computer to process three-dimensional graphic images, by:
 inputting a first two-dimensional graphic image input by a user;
 inputting a second two-dimensional graphic image input by a user; and
 generating a three-dimensional graphic image based on the first two-dimensional graphic image and the second two-dimensional graphic image,
 wherein the first two-dimensional graphic image is input as a plan shape and the second two-dimensional graphic image is input as a cross-sectional shape defining a relationship between distances measured from an edge of said plan shape and respective heights at the measured distances.

14. The computer-readable storage medium as claimed in claim 13, wherein:
 said two-dimensional graphic image input by said inputting a second two-dimensional graphic image defines a cross-sectional shape shown in distance and height coordinates; and
 said generating a three-dimensional graphic image corresponds a minimum distance, between a given position in said plan shape and the edge of said plan shape, to the distance coordinate of said cross-sectional shape, so that the height obtained by the distance coordinate of the cross-sectional shape is defined as a height at the given position in said plan shape.

15. The computer-readable storage medium as claimed in claim 13, wherein said inputting a second two-dimensional graphic image is a graph generating program generating a graph showing a relationship between a distance from an edge of said plan shape and a height.

16. The computer-readable storage medium as claimed in claim 13, wherein said inputting a first two-dimensional graphic image are programs, each generating a two-dimensional graph image.

17. An apparatus for processing three-dimensional graphic images, said apparatus comprising:
 a first input part inputting a first two-dimensional graphic image input by a user;
 a second input part inputting a second two-dimensional graphic image input by a user; and
 a three-dimensional graphic image generating part generating a three-dimensional graphic image based on the first two-dimensional graphic image and the second two-dimensional graphic image, wherein:
 the first two-dimensional graphic image is input as a plan shape and the second two-dimensional graphic image is input as a cross-sectional shape defining a relationship between distances measured from an edge of said plan shape, which plan shape is input by said first input part, and respective heights at the measured distances,
 said second two-dimensional graphic image, input by said second input part, defines a cross-sectional shape shown in distance and height coordinates, and
 said three-dimensional graphic image generating part corresponds a minimum distance, between a given position in said plan shape and the edge of said plan shape, to the distance coordinate of said cross-sectional shape, the height obtained by the distance coordinate of the cross-sectional shape being defined as a height at the given position in said plan shape.

18. The apparatus as claimed in claim 17, wherein said second input part is a graph generating program generating a graph showing a relationship between a distance from an edge of said plan shape and a height at the distance.

19. The apparatus as claimed in claim 17, wherein said first input part and said second input part are programs, each generating a respective two-dimensional graph image.

20. A method for processing three-dimensional graphic images, said method comprising:
 first inputting a first two-dimensional graphic image input by a user;
 second inputting a second two-dimensional graphic image input by a user; and
 generating a three-dimensional graphic image based on the first two-dimensional graphic image and the second two-dimensional graphic image, wherein:
 the first two-dimensional graphic image is input as a plan shape and the second two-dimensional graphic image is input as a cross-sectional shape defining a relationship between distances measured from an edge of said plan shape, which plan shape is input by said inputting a first two-dimensional image, and respective heights at the measured distances, said two-dimensional graphic image input by said second inputting defines a cross-sectional shape shown in distance and height coordinates, and said inputting a second two-dimensional graphic image corresponds a minimum distance, between a given position in said plan shape and the edge of said plan shape, to the distance coordinate of said cross-sectional shape, the height obtained by the distance coordinate of the cross-sectional shape being defined as a height at the given position in said plan shape.

21. The method as claimed in claim 20, wherein said second inputting is performed by a graph generating program generating a graph showing a relationship between a distance from an edge of said plan shape and a height at the distance.

22. The method as claimed in claim 20, wherein said first inputting and said second inputting are programs each generating a respective two-dimensional graphic image.

23. A computer-readable recording medium storing a program controlling a computer to process three-dimensional graphic images, by:

inputting a first two-dimensional graphic image input by a user;

inputting a second two-dimensional graphic image input by a user; and generating a three-dimensional graphic image based on the first two-dimensional graphic image and the second two-dimensional graphic image, wherein:

the first two-dimensional graphic image is input as a plan shape and the second two-dimensional graphic image is input as a cross-sectional shape defining a relationship between distances measured from an edge of said plan shape and respective heights at measured distances, said second two-dimensional graphic image input by said first inputting defines a cross-sectional shape shown in distance and height coordinates, and said second inputting corresponds a minimum distance, between a given position in said plan shape and the edge of said plan shape, to the distance coordinate of said cross-sectional shape, so that the height obtained by the distance coordinate of the cross-sectional shape is defined as a height at the given position in said plan shape.

24. The computer-readable recording medium as claimed in claim 23, wherein said second inputting is a graph generating program generating a graph showing a relationship between a distance from an edge of said plan shape and a height.

25. The computer-readable recording medium as claimed in claim 23, wherein said first inputtng and said second inputting are programs, each generating a respective two-dimensional graph image.

26. A computer-readable storage medium storing a program controlling a computer to process three-dimensional graphic images by:

inputting a first two-dimensional graphic image input by a user;

inputting a second two-dimensional graphic image input by a user; and generating a three-dimensional graphic image based on the first two-dimensional graphic image and the second two-dimensional graphic image, wherein:

the first two-dimensional graphic image is input as a plan shape and the second two-dimensional graphic image is input as a cross-sectional shape defining a relationship between distances measured from an edge of said plan shape and respective heights at the measured distance, said two-dimensional graphic image input by said inputting a second two-dimensional graphic image defines a cross-sectional shape shown in distance and height coordinates, and said generating a three-dimensional graphic image corresponds a minimum distance, between a given position in said plan shape and the edge of said plan shape, to the distance coordinate of said cross-sectional shape, so that the height obtained by the distance coordinate of the cross-sectional shape is defined as a height at the given position in said plan shape.

27. The computer-readable storage medium as claimed in claim 26, wherein said inputting a second two-dimensional graphic image is a graph generating program generating a graph showing a relationship between a distance from an edge of said plan shape and a height.

28. The computer-readable storage medium as claimed in claim 26, wherein said inputting a first two-dimensional graphic image are programs, each generating a two-dimensional graph image.

* * * * *

UNITED STATES PATENT AND TRADEMARK OFFICE
CERTIFICATE OF CORRECTION

PATENT NO. : 7,042,453 B2 Page 1 of 1
APPLICATION NO. : 09/789962
DATED : May 9, 2006
INVENTOR(S) : Itaru Hatanaka et al.

It is certified that error appears in the above-identified patent and that said Letters Patent is hereby corrected as shown below:

Title Page, Item (56) Column 2 (Other Publications), Line 3, after "No. 6" insert --,--

Column 16, Line 5, change "inputting" and insert --inputting--.

Signed and Sealed this

Seventh Day of November, 2006

JON W. DUDAS
*Director of the United States Patent and Trademark Office*